(12) United States Patent
Lich et al.

(10) Patent No.: US 7,522,991 B2
(45) Date of Patent: Apr. 21, 2009

(54) DEVICE FOR DETERMINING THE CENTRE OF ROTATION OF A VEHICLE ABOUT A VEHICLE VERTICAL AXIS

(75) Inventors: Thomas Lich, Schwaikheim (DE); Michael Schmid, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 456 days.

(21) Appl. No.: 10/532,376

(22) PCT Filed: Jul. 22, 2004

(86) PCT No.: PCT/DE2004/001603

§ 371 (c)(1),
(2), (4) Date: Sep. 21, 2005

(87) PCT Pub. No.: WO2005/044650

PCT Pub. Date: May 19, 2005

(65) Prior Publication Data

US 2006/0150717 A1 Jul. 13, 2006

(30) Foreign Application Priority Data

Oct. 31, 2003 (DE) ................................ 103 50 920

(51) Int. Cl.
*G06F 7/00* (2006.01)

(52) U.S. Cl. ...................................... 701/124; 180/271
(58) Field of Classification Search ................. 701/124, 701/45–48, 36; 307/9.1; 340/425.5, 435, 340/436; 180/271, 282
See application file for complete search history.

(56) References Cited

U.S. PATENT DOCUMENTS

| | | | | |
|---|---|---|---|---|
| 6,113,138 A * | 9/2000 | Hermann et al. | ............ | 280/735 |
| 6,161,905 A * | 12/2000 | Hac et al. | ................... | 303/146 |
| 6,223,114 B1 * | 4/2001 | Boros et al. | ................... | 701/70 |
| 6,304,805 B1 * | 10/2001 | Onogi | ........................ | 701/36 |
| 6,829,524 B2 * | 12/2004 | Chee | ............................ | 701/1 |
| 2002/0165646 A1 * | 11/2002 | Bohr et al. | ..................... | 701/1 |

FOREIGN PATENT DOCUMENTS

| | | |
|---|---|---|
| DE | 196 51 124 | 5/1998 |
| DE | 100 17 084 | 8/2001 |
| DE | 100 15 267 | 10/2001 |

* cited by examiner

*Primary Examiner*—Dalena Tran
(74) *Attorney, Agent, or Firm*—Kenyon & Kenyon LLP

(57) ABSTRACT

A device for determining a center of rotation of a vehicle around the vehicle's vertical axis determines the center of rotation as a function of a yaw rate and a float angle.

26 Claims, 4 Drawing Sheets

DEVICE FOR DETERMINING THE CENTRE OF ROTATION OF A VEHICLE ABOUT A VEHICLE VERTICAL AXIS

FIELD OF THE INVENTION

The present invention is directed to a device for determining a center of rotation of a vehicle around a vertical axis of the vehicle.

SUMMARY OF THE INVENTION

The device according to the present invention for determining a center of rotation of a vehicle around a vertical axis of the vehicle has the advantage that the device detects the shifting of the center of rotation so that vehicle-dynamic quantities are referred to the instantaneous correct center of rotation. In the case of spinning motions around the vehicle's vertical axis, the center of rotation is initially always at the front area of the vehicle. Over the course of the spinning motion, the center of rotation moves toward the vehicle's center of mass. This shift in the center of rotation is then advantageously used to correctly determine the vehicle-dynamic quantities. Active regulating systems, such as an Electronic Stability Program (ESP), are thereby more safely regulatable, and passenger protection means such as belt tensioners and air bags are activatable with much greater safety and reliability. The device according to the present invention is suitable, in particular for rollover sensing systems, which involve a combination of active and passive safety. In this regard, it is extremely important to correctly detect the lateral velocity at the vehicle's center of mass to avoid spurious and/or early deployment in the event of a rollover. The center of rotation shift is advantageously determined as a function of the float angle and yaw rate. The float angle specifies the angle between the vehicle's longitudinal axis and the velocity vector. The yaw rate is the rotation of the vehicle around a vertical axis.

The fact that the device additionally takes into account the variation of the float angle as a function of time in determining the center of rotation is particularly advantageous. A substantial variation of the float angle indicates that the vehicle is swerving, and this variation may be used to initiate the calculation of the center of rotation.

Both the yaw rate and the float angle are advantageously determinable via other vehicle-dynamic quantities such as the vehicle's lateral acceleration or lateral velocity and the vehicle's longitudinal acceleration and longitudinal velocity. In particular, the float angle is determinable in an equivalent manner via vehicle-dynamic quantities in the longitudinal and lateral directions of the vehicle. It is therefore not necessary to measure the yaw rate and float angle.

A further advantage is that the sensor system for detecting the float angle is provided at the rear area of the vehicle. Alternatively, this sensor system is also locatable at the front of the vehicle. The sensor system is preferably designed in the form of optical sensors. This means that the measuring principle is optical. For example, an optical sensor system that monitors the road surface may be used for this purpose. In doing this, the stochastic microstructure of the road surface is mapped to a periodic prism grating in the sensor. The temporal frequencies resulting from the multiplication of the changed microstructure by the periodic grating structure are integrated over the sensor field to obtain an average value. To maximize the measuring accuracy, the grating period, which typically lies between 100 and 800 micrometers, should match the local frequency spectrum of the road surface. Additional signal processing makes it possible to determine the velocity by counting signal periods that are directly proportional to the distance traveled by the vehicle. In particular, segmenting the grating area enables the velocities to be determined two-dimensionally. Other options are to detect the direction of travel, and thus the float angle. However, other measurement methods are also possible for determining the float angle. These generally include all sensor principles that are able to measure velocity or position over the ground. In addition to optical sensors, radar-based or ultrasound sensors are possible. A further measurement method for detecting the float angle may also be based on positioning technology such as a global positioning system.

The center of rotation is determinable by the yaw rate and float angle in such a way that values for the yaw rate and float angle are stored in a table from which the center of rotation is determined. Therefore, tests are conducted on the vehicles ahead of time to obtain values which are subsequently accessible for determining the instantaneous center of rotation. Alternatively, a function that reflects the correlation between the float angle and yaw rate as well as the instantaneous center of rotation is determinable either empirically or analytically.

As described above, the instantaneous center of rotation is useful for an Electronic Stability Program, since the Electronic Stability Program may use the instantaneous center of rotation to more precisely determine vehicle-dynamic quantities, in particular the vehicle's lateral velocity. This allows more accurate calculations of the instantaneous driving situation to be obtained with regard to vehicle regulation, ensuring safer regulation of the vehicle compared to the related art. Knowledge of the instantaneous center of rotation is also enormously advantageous for optimum activation of a passenger protection system that activates passenger protection means such as seat belt tensioners and air bags, since vehicle-dynamic quantities are incorporated into the deployment algorithm in this case as well, enabling better determination thereof.

DETAILED DESCRIPTION

Data from the United States documents the importance of passive safety in the event of a vehicle rollover. In 1998, half of all fatal accidents involving a single vehicle were attributable to a rollover. Vehicle rollover accounts for roughly 20 percent of all accidents. In critical driving maneuvers, however, the following situation inevitably arises due to the vehicle structure: If a vehicle starts to spin as a result of external circumstances, the vehicle's center of rotation is initially located at the front wheels. Depending on the situation, the rate of rotation may result in the vehicle rotating completely over the front wheels or the center of rotation migrating. As a rule, the center of rotation migrates in the direction of the vehicle's center of mass, i.e., the vehicle rotates around its center of mass. However, it is also possible for the center of rotation to even migrate toward the rear axis. An object of the present invention, therefore, is to determine the shift in the center of rotation so that this shift may be taken into account for determining vehicle-dynamic quantities. Consequently, vehicle-dynamic quantities, such as the float angle, are correctly mappable to any point in the vehicle geometry, such as the vehicle's center of mass, as a function of the center of rotation that varies over time. In particular, this applies to the use of sensors for determining the float angle by transforming the measured quantities to a reference point located in the vehicle geometry, e.g., the vehicle's center of mass. The advantage of this approach is that it allows the vehicle-dynamic quantities to be correctly calculated with regard to the reference point, i.e., the vehicle's center of mass. This substantially increases the safety of passenger protection means such as seat belt tensioners and head air bags and allows them to be activated more reliably. This is further relevant for a rollover sensing system that involves a combination of active and passive safety. For this purpose, it is very important to correctly detect the lateral velocity in the center of mass to avoid spurious and early releases.

Vehicle-dynamic-supported regulation of the float angle provides an additional advantage. Since this requires a selective transformation to the vehicle axes, it enables the regulation quantities to be better estimated and increases vehicle stability.

Figure 1:
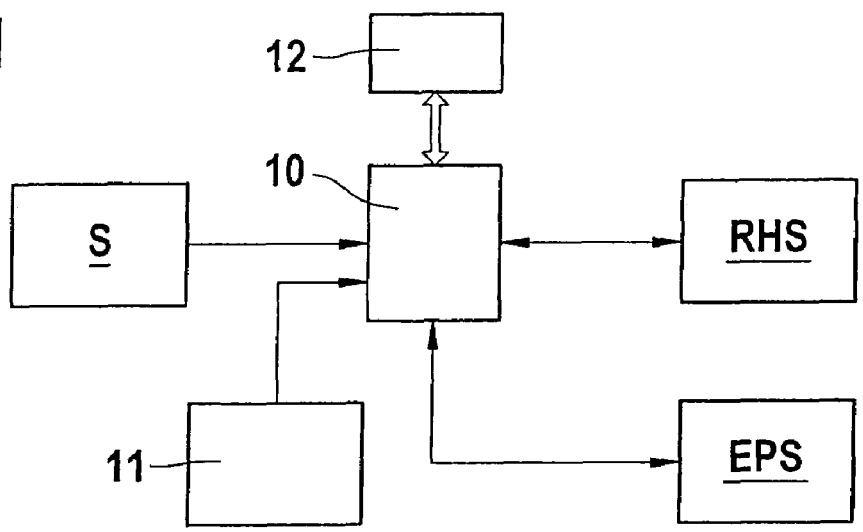
FIG. 1 shows a block diagram of the device according to the present invention.

FIG. 1 shows a block diagram of the device according to the present invention. A float angle sensor S is connected to a first data input of a processor 10. This processor 10 may be a microprocessor or microcontroller. In particular, processor 10 may be mounted in a control unit, for example a control unit for an Electronic Stability Program or a passenger protection system. A yaw rate sensor 11 is connected to a second data input of processor 10. Processor 10 is connected to a memory 12 via a first data input/output. Data is permanently storable in memory 12. It is possible for memory 12 to also have a volatile memory area. Processor 10 is connected to a passenger protection system RHS (restraint system) via a second data input/output. This makes it possible to transmit the instantaneous center of rotation to passenger protection system RHS so that passenger protection means such as air bags or seat belt tensioners are activatable as a function thereof. An Electronic Stability Program ESP is also connected to processor 10 via a third data input/output to obtain the instantaneous center of rotation. Knowledge of the instantaneous center of rotation is highly advantageous even for vehicle stabilization, for which the Electronic Stability Program is responsible.

Processor 10 determines the instantaneous center of rotation on the basis of the current float angle and yaw rate, using a table that is stored in memory 12.

The following equation applies to float angle variation $\beta$:

$$\dot{\beta} = \omega_z - \frac{a_y}{v_x} * \cos^2(\beta) - \frac{a_x}{v_x} * \sin(\beta) * \cos(\beta)$$

The float angle is calculable therefrom through integration:

$$\beta = \beta_0 + \int \dot{\beta} dt$$

Quantities $\omega z$ designate the yaw rate, $ay$ the lateral acceleration, $ax$ the longitudinal acceleration, $vx$ the velocity in the longitudinal direction, and $\beta$ the float angle. In normal driving situations, the float angle is in the range of 4 to 8 degrees and represents a non-critical quantity for the algorithms of the restraint systems. The regulating action of Electronic Stability Program ESP also takes place in this range, so that hazardous situations are detected and, in situations in which the vehicle threatens to swerve, the vehicle is stabilized by precisely braking individual wheels. In situations in which the Electronic Stability program ESP is unable to perform its regulating action, allowing the vehicle to definitively swerve, float angles greater than 10 degrees occur, and the vehicle rotates around its vertical axis with or without a translatory motion of the vehicle.

A similar algorithm that is activated on the basis of the float angle buildup, the float angle variation, may be used to determine the variable center of rotation. Because the rotation normally begins at the front, the float angle and yaw rate may be used to establish a function so that, for example, the center of mass of the rotation moves toward the vehicle's center of mass, starting at a float angle of, for example, 25 degrees and a yaw rate of 50 degrees per second. As the float angle and yaw rate increase, the vehicle inevitably rotates around the vehicle's center of mass. This makes it possible to describe the variation of the center of rotation as a function of the float range, yaw rate and possibly the float angle variation.

The variation of the center of rotation is determinable on the basis of a simple look-up table that initially describes a linear correlation between the distance between the vehicle's center of mass and the center of rotation as a function of the yaw rate, after a swerving motion has been detected. Therefore, the float angle serves as a condition for detecting the swerving motion, while the yaw rate is used to determine the instantaneous center of rotation. The following table provides an example of a yaw rate and the distance between the sensor for determining the float angle and the center of rotation. This distance and the distance between the sensor and the center of mass yield the distance between the instantaneous center of rotation and the center of mass.

| Yaw rate wz [°/s] | -> Distance between sensor and center of rotation $l_{sensor,\ center\ of\ rotation}$ |
|---|---|
| 10 | Maximum -> sensor position relative to the front, e.g., right or left, depending on the swerving direction, e.g., 7 m |
| 20 | 4.8 m |
| 30 | 4.5 m |
| 40 | 4 m |
| 50 | 3.8 m |
| 60 | 3.54 m |
| 70 | 3.25 m |
| 80 | 3 m |
| >=90 | Distance between sensor and vehicle's center of mass, which is known, e.g., 2.95 |

Figure 2:
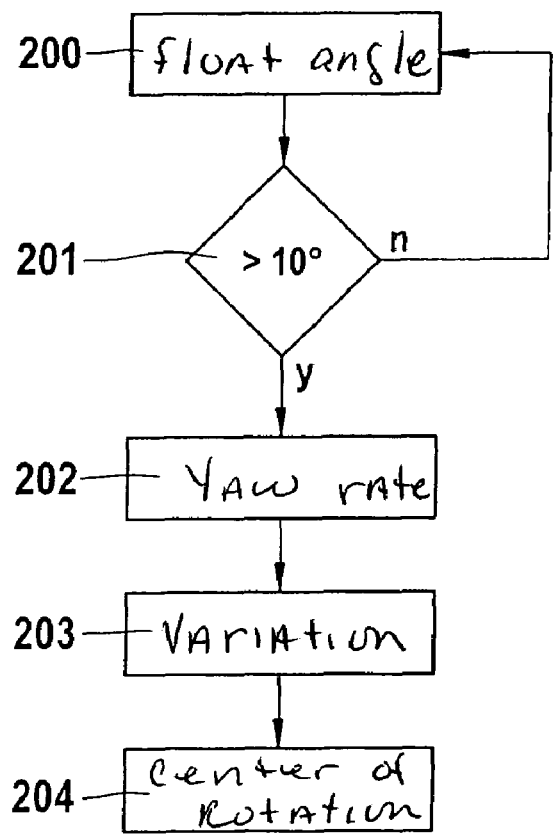
FIG. 2 shows a flowchart.

FIG. 2 shows a flowchart of the steps completed by the device according to the present invention. In method step 200, sensor S is used to detect the float angle. Method step 201 checks whether the float angle exceeds a certain limit, the limit in this case being 10 degrees. However, it is also possible to use 8 degrees or a similar value. If the float angle is below this value, it is assumed that no swerving action is taking place, and the program returns to method step 200. However, if the float angle exceeds 10 degrees, the program jumps to method step 202 and uses the yaw rate, as shown above, to determine the instantaneous center of rotation. For this purpose, method step 203 implements the above-mentioned table or an equation to determine the variation of the center of rotation and to subsequently determine the corresponding value, for example, the distance between the center of mass and the center of rotation, to achieve an optimum transformation of vehicle-dynamic quantities. In method step 204, the center of rotation is determined so that the initial center of rotation, which is assumed to be at the front of the vehicle, and the variation of the center of rotation are combined to establish the instantaneous center of rotation.

Figure 3:
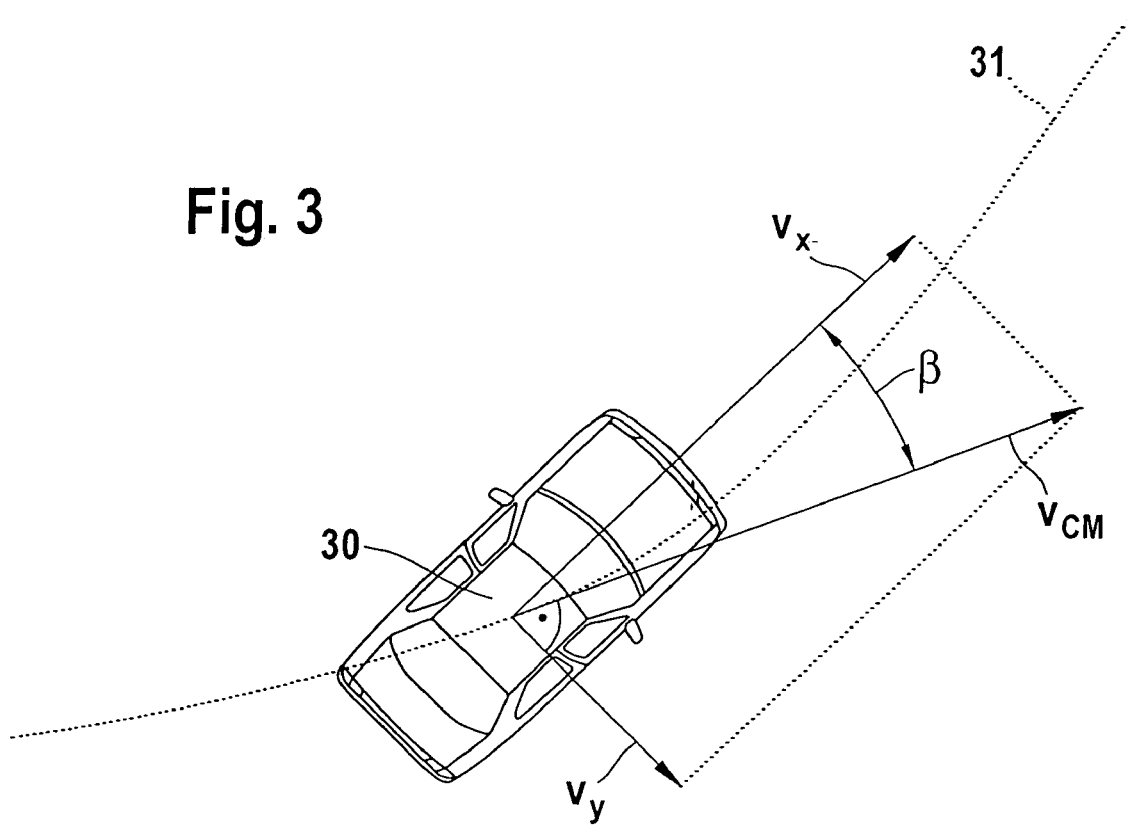
FIG. 3 shows the float angle of a vehicle.

FIG. 3 shows the fundamental vehicle-dynamic quantities to be taken into account. Vehicle 30 moves along a trajectory 31. Vehicle 30 has a velocity component $v_x$ in the longitudinal direction and a velocity component $v_y$ in the lateral direction. These two quantities yield a vector $v_{CM}$ that describes the tangent to trajectory 31. Angle β lies between vectors $v_{CM}$ and $v_x$. This angle is the float angle.

Figure 4A:
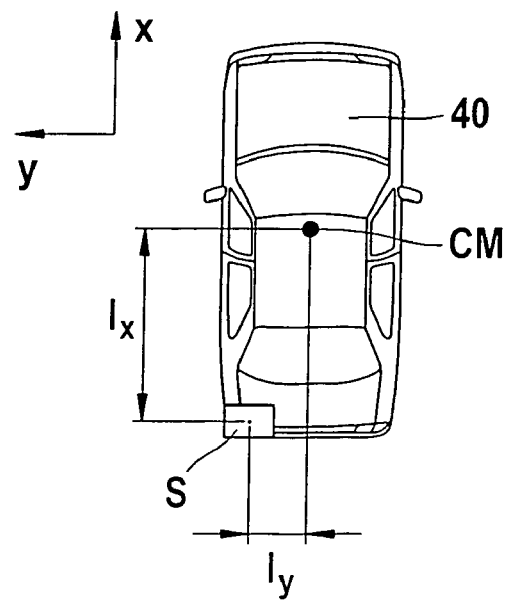
FIGS. 4a-4c shows spinning motions of a vehicle.
Figure 4B:
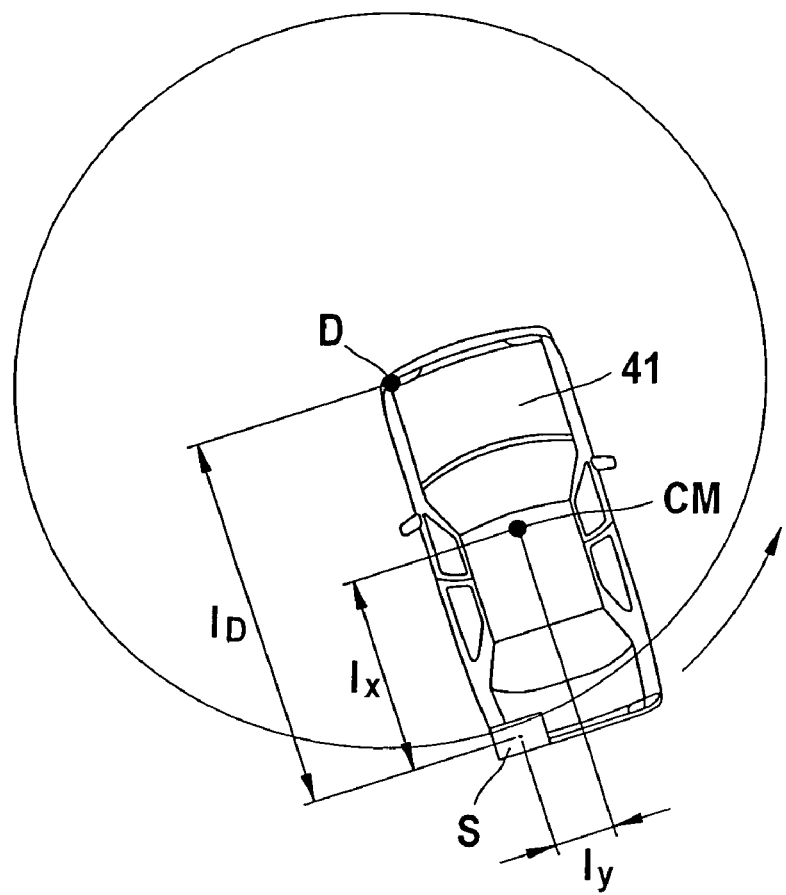
Figure 4C:
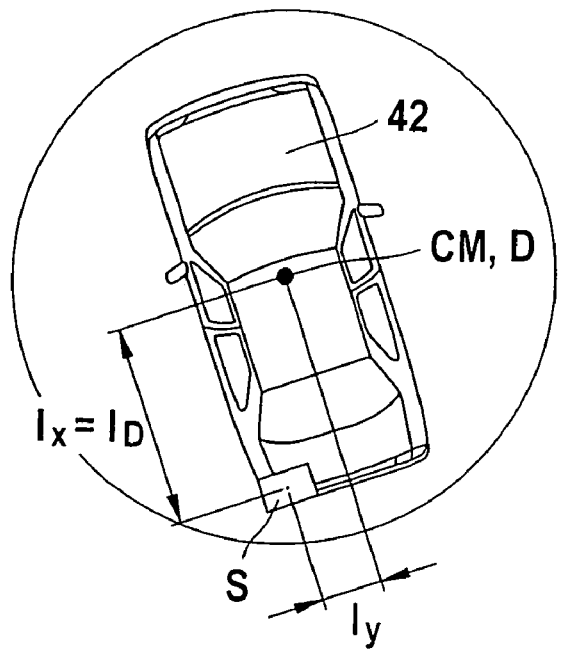

FIGS. 4a-4c describe the initial and end situations of a swerving motion. In FIG. 4a, a vehicle 40 has a center of mass CM and a sensor S for detecting the float angle, sensor S being provided at the rear of the vehicle, for example, on the rear bumper. The distance between sensor S and center of mass CM is specified by quantities $I_x$ in the vehicle's longitudinal direction and $I_y$ in its lateral direction. FIG. 4b shows the rotation of the vehicle around the front axis. Center of rotation D is indicated at the front of vehicle 41. Center of mass CM is naturally constant, as is the mounting location of sensor S. Sensor S is located a distance $I_d$ from center of rotation D in the longitudinal direction. However, center of rotation D migrates during the swerving motion so that its end state is shown in FIG. 4c, where center of rotation D coincides with center of mass CM. Sensor S is thus positioned at the same distance from center of mass CM and center of rotation D in the longitudinal direction, i.e., $I_x=I_d$.

Sensor S is provided at the rear of the vehicle and measures, for example, longitudinal velocity $v_{x,sensor}$ and lateral velocity $v_{y,sensor}$. The sensor is located at a distance $I_{sensor,VA}=\sqrt{I_{x,sensor,VA}^2+I_{y,sensor,VA}^2}$ from the front axis and a distance $I_{sensor,CM}=\sqrt{I_{s,sensor,CM}^2+I_{y,sensor,CM2}^2}$ from the center of mass.

This yields velocity $v_{CM}$ of the center of mass, taking into account the position relative to the sensor from:

$$V_{cm}=V_{sensor}+\omega_z \cdot l_{sensor,CM}$$

The key assumption here is that the rotation takes place around the center of mass. This is not true at the beginning of a swerving motion and it does not necessarily have to apply during the swerve. Instead, a certain dependency on the yaw rate determines whether the rotation energy is or is not sufficient to cause the vehicle to rotate. This means that the velocity established above is corrupted by the rotatory component, since the distance between the center of rotation and the sensor is a time-dependent quantity:

$$v_{CM}=v_{sensor}+\omega_x \cdot l_{sensor,centerofrotation}(t, \omega_2)$$

At the beginning of the swerving motion, the distance obtained is generally the difference between the sensor and the front axis, since the vehicle rotation may always be initiated around the front wheels. Depending on the surface, yaw rate and other factors, it is possible for the vehicle to rotate around the front wheels or for the center of rotation to shift from the front axis to the center of mass. If this happens, the vehicle rotates around the center of mass, and the above initial formula applies once more.

Figure 5:
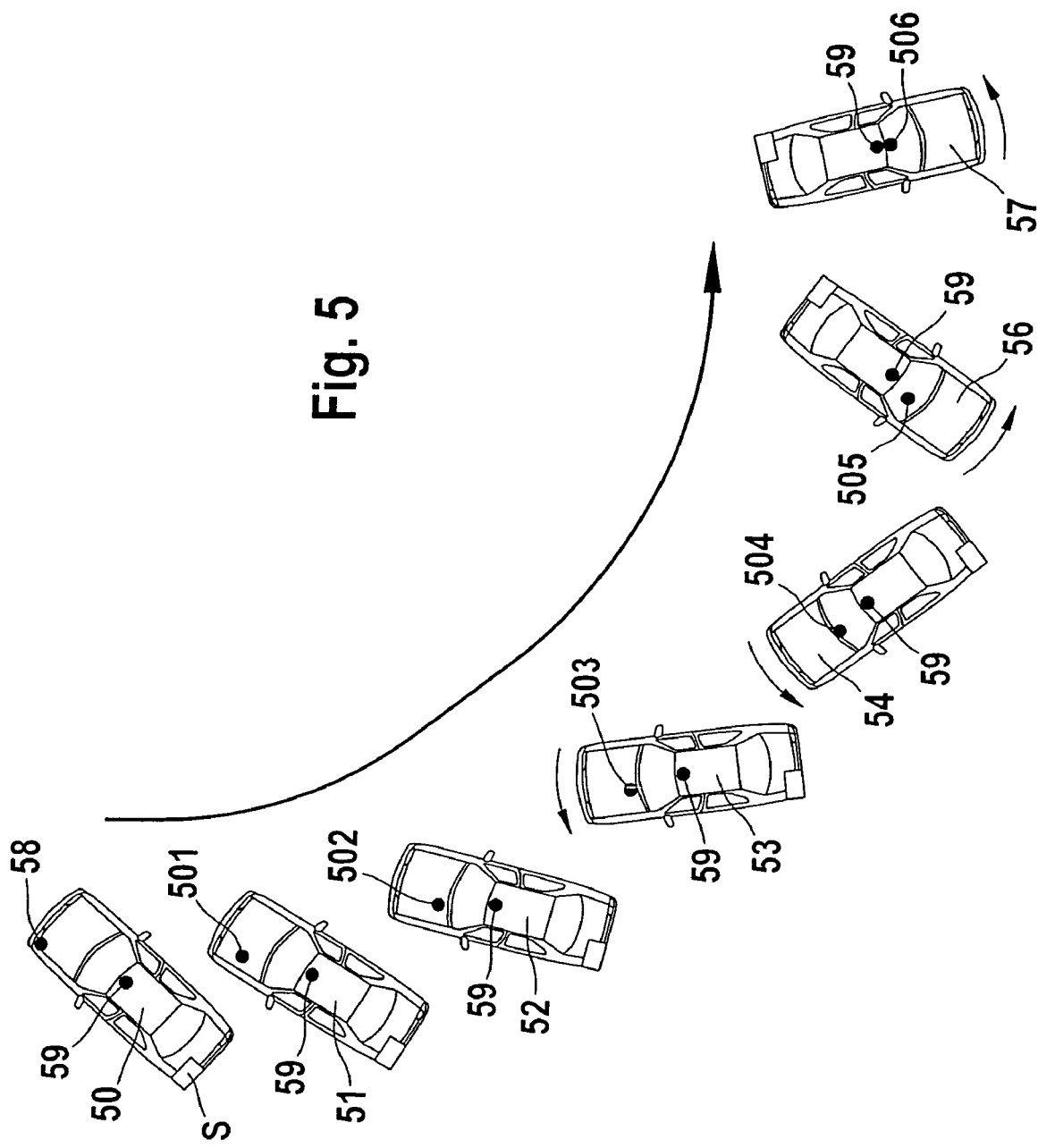
FIG. 5 shows the migration of the center of rotation during the spinning motion.

FIG. 5 shows a kind of time-lapse diagram that illustrates the migration of the center of rotation. The vehicle is initially in position 50 and has center of mass 59, center of rotation 58 and sensor S. The sensor is located at the maximum distance. In the next step, the center of rotation has moved to point 501 so that vehicle 51 now rotates around center of rotation 501. In image 52, the center of rotation has moved to position 502 and is now closer to center of mass 59. In image 53, the center of rotation has moved farther along, as it has in image 54, where center of rotation 504 is already in the area of the windshield. In image 56, center of rotation 505 has moved closer to center of mass 59, center of rotation 506 subsequently reaching center of mass 59 in image 57. As the yaw rate and float angle increase, the center of rotation migrates toward the vehicle's center of mass.

What is claimed is:

1. A device for determining a center of rotation of a vehicle around a vertical axis of the vehicle, comprising:
    an arrangement for determining the center of rotation as a function of a yaw rate and a float angle.

2. The device according to claim 1, wherein the arrangement for determining the center of rotation additionally takes into account at least one of a float angle variation and a lateral velocity.

3. The device according to claim 1, further comprising:
    an arrangement for determining the yaw rate as a function of linear vehicle-dynamic quantities.

4. The device according to claim 1, further comprising:
    an arrangement for determining the float angle as a function of linear vehicle-dynamic quantities.

5. The device according to claim 1, further comprising a sensor system situated at a rear area of the vehicle to detect the float angle.

6. The device according to claim 5, wherein the sensor system includes at least one of an optical, an ultrasound-based, a radar-based and a positioning based system.

7. The device according to claim 1, further comprising:
    a memory in which data relating to the yaw rate and the float angle are stored, the arrangement determining the center of rotation as a function of the data.

8. The device according to claim 1, wherein the device is connected to an Electronic Stability Program (ESP) so that the Electronic Stability Program (ESP) takes the center of rotation into account when determining vehicle-dynamic quantities.

9. The device according to claim 1, wherein the device is connected to a passenger protection system (RHS) so that the passenger-protection system (RHS) takes the center of rotation into account when activating passenger protection devices.

10. The device according to claim 1, further comprising:
    an arrangement for determining the yaw rate as a function of linear vehicle-dynamic quantities,
    wherein the arrangement for determining the center of rotation additionally takes into account at least one of a float angle variation and a lateral velocity.

11. The device according to claim 10, further comprising:
    an arrangement for determining the float angle as a function of linear vehicle-dynamic quantities.

12. The device according to claim 11, further comprising:
    a sensor system situated at a rear area of the vehicle to detect the float angle.

13. The device according to claim 12, wherein the sensor system includes at least one of an optical, an ultrasound-based, a radar-based and a positioning based system.

14. The device according to claim 12, further comprising:
    a memory in which data relating to the yaw rate and the float angle are stored, the arrangement determining the center of rotation as a function of the data.

15. The device according to claim 12, wherein the device is connected to an Electronic Stability Program (ESP) so that the Electronic Stability Program (ESP) takes the center of rotation into account when determining vehicle-dynamic quantities.

16. The device according to claim 12, wherein the device is connected to a passenger protection system (RHS) so that the passenger-protection system (RHS) takes the center of rotation into account when activating passenger protection devices.

17. The device according to claim 10, wherein the sensor system includes at least one of an optical, an ultrasound-based, a radar-based and a positioning based system.

18. The device according to claim 10, further comprising:
a memory in which data relating to the yaw rate and the float angle are stored, the arrangement determining the center of rotation as a function of the data.

19. The device according to claim 10, wherein the device is connected to an Electronic Stability Program (ESP) so that the Electronic Stability Program (ESP) takes the center of rotation into account when determining vehicle-dynamic quantities.

20. The device according to claim 10, wherein the device is connected to a passenger protection system (RHS) so that the passenger-protection system (RHS) takes the center of rotation into account when activating passenger protection devices.

21. The device according to claim 1, wherein the center of rotation is computed with respect to a center of mass of the vehicle.

22. The device according to claim 21, wherein a variation of the center of rotation is determined based on a linear correlation between the center of mass and the center of rotation as a function of the yaw rate.

23. The device according to claim 22, wherein the determination of the variation of the center of rotation is conditioned the float angle exceeding a threshold value.

24. A device for determining a center of rotation of a vehicle around a vertical axis of the vehicle, comprising:
an arrangement for determining the center of rotation as a function of a yaw rate and a float angle, for determining the yaw rate as a function of linear vehicle-dynamic quantities, and for determining the float angle as a function of linear vehicle-dynamic quantities, wherein the arrangement includes a sensor system situated at a rear area of the vehicle to detect the float angle;
a memory in which data relating to the yaw rate and the float angle are stored, the arrangement determining the center of rotation as a function of the data;
wherein the arrangement for determining the center of rotation additionally takes into account at least one of a float angle variation and a lateral velocity,
wherein the center of rotation is computed with respect to a center of mass of the vehicle,
wherein a variation of the center of rotation is determined based on a linear correlation between the center of mass and the center of rotation as a function of the yaw rate, and
wherein the determination of the variation of the center of rotation is conditioned the float angle exceeding a threshold value.

25. The device according to claim 24, wherein the device is connected to an Electronic Stability Program (ESP) so that the Electronic Stability Program (ESP) takes the center of rotation into account when determining vehicle-dynamic quantities.

26. The device according to claim 24, wherein the device is connected to a passenger protection system (RHS) so that the passenger-protection system (RHS) takes the center of rotation into account when activating passenger protection devices.

* * * * *